United States Patent
Steele et al.

(10) Patent No.: US 8,687,812 B2
(45) Date of Patent: *Apr. 1, 2014

(54) METHOD AND APPARATUS FOR PUBLIC KEY CRYPTOGRAPHY

(75) Inventors: Joseph D. Steele, Danville, CA (US); Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/423,858

(22) Filed: Mar. 19, 2012

(65) Prior Publication Data

US 2014/0032909 A1 Jan. 30, 2014

Related U.S. Application Data

(63) Continuation of application No. 11/800,242, filed on May 3, 2007, now Pat. No. 8,165,303.

(51) Int. Cl.
*H04L 9/12* (2006.01)
*H04L 9/08* (2006.01)
*H04L 9/32* (2006.01)

(52) U.S. Cl.
CPC .............. *H04L 9/0869* (2013.01); *H04L 9/321* (2013.01); *H04L 9/3263* (2013.01)
USPC ............................................ 380/277; 380/44

(58) Field of Classification Search
None
See application file for complete search history.

(56) References Cited

U.S. PATENT DOCUMENTS

| | | | |
|---|---|---|---|
| 5,732,138 A | 3/1998 | Noll et al. | |
| 5,774,549 A | 6/1998 | Nielsen | |
| 6,868,160 B1 | 3/2005 | Raji | |
| 7,424,115 B2 | 9/2008 | Hyyppä et al. | |
| 7,451,307 B2 | 11/2008 | Matsushima | |
| 7,457,413 B2 | 11/2008 | Thuvesholmen et al. | |
| 8,165,303 B1 | 4/2012 | Steele et al. | |
| 2001/0046307 A1* | 11/2001 | Wong | 382/100 |
| 2002/0001387 A1 | 1/2002 | Dillon | |
| 2002/0144068 A1 | 10/2002 | Ohran | |
| 2004/0001631 A1* | 1/2004 | Camara et al. | 382/224 |
| 2004/0136372 A1 | 7/2004 | Gruia | |
| 2005/0091485 A1 | 4/2005 | Imai | |
| 2005/0114664 A1 | 5/2005 | Davin | |
| 2006/0002550 A1 | 1/2006 | Champagna et al. | |
| 2006/0149683 A1* | 7/2006 | Shimojima et al. | 705/59 |

OTHER PUBLICATIONS

"U.S. Appl. No. 11/800,242 Non-Final Office Action mailed Nov. 9, 2010", 3 pgs.
"U.S. Appl. No. 11/800,242, Examiner Interview Summary Filed Jan. 27, 2011", 1 pg.

(Continued)

*Primary Examiner* — Gilberto Barron, Jr.
*Assistant Examiner* — David Le
(74) *Attorney, Agent, or Firm* — Schwegman Lundberg & Woessner, P.A.

(57) ABSTRACT

Method and apparatus are described wherein, in one example embodiment, a first entity shares a digital file such as a digital image with a second entity, and the first entity and the second entity each use the digital file as a seed to generate identical public/private key pairs using the same key generation procedure, such that both entities hold identical key pairs. The first and second entities may use the key pairs to encrypt, decrypt, or sign and authenticate communications between the entities.

20 Claims, 7 Drawing Sheets

(56) References Cited

OTHER PUBLICATIONS

"U.S. Appl. No. 11/800,242, Examiner Interview Summary mailed Jan. 21, 2011", 3 pgs.

"U.S. Appl. No. 11/800,242, Examiner Interview Summary mailed May 12, 2011", 3 pgs.

"U.S. Appl. No. 11/800,242, Examiner Interview Summary mailed Oct. 24, 2011", 3 pgs.

"U.S. Appl. No. 11/800,242, Non Final Office Action mailed Mar. 4, 2011", 13 pgs.

"U.S. Appl. No. 11/800,242, Non Final Office Action mailed Jul. 19, 2011", 13 pgs.

"U.S. Appl. No. 11/800,242, Non-Final Office Action mailed May 24, 2010", 13 pages.

"U.S. Appl. No. 11/800,242, Notice of Allowance Mailed Dec. 19, 2011", 8 pgs.

"U.S. Appl. No. 11/800,242, Response filed Jan. 27, 2011 to Non Final Office Action mailed Nov. 9, 2010", 13 pgs.

"U.S. Appl. No. 11/800,242, Response filed May 9, 2011 to Non Final Office Action mailed Mar. 4, 2011", 13 pgs.

"U.S. Appl. No. 11/800,242, Response filed Oct. 14, 2011 to Non Final Office Action mailed Jul. 19, 2011", 11 pgs.

"U.S. Appl. No. 11/800,242, Response filed Aug. 20, 2010 to Non Final Office Action mailed May 24, 2010", 11 pgs.

\* cited by examiner

METHOD AND APPARATUS FOR PUBLIC KEY CRYPTOGRAPHY

CROSS-REFERENCE TO RELATED APPLICATIONS

This patent application is a continuation of U.S. patent application Ser. No. 11/800,242 filed May 3, 2007, which is incorporated herein by reference in its entirety.

TECHNICAL FIELD

The subject matter relates generally to the field of computer security, and more particularly to the secure exchange of information.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007, Adobe Systems Inc. All Rights Reserved.

BACKGROUND

Public key cryptography, also known as asymmetric cryptography, is a form of cryptography in which a user has a pair of cryptographic keys—a public key and a private key. The private key is kept secret, while the public key may be widely distributed. The keys are related mathematically, but the private key cannot be practically derived from the public key. A message encrypted with the public key can only be decrypted with the corresponding private key. The two main branches of public key cryptography are public key encryption and digital signatures. Using public key encryption, a message encrypted with a user's public key cannot be decrypted by anyone except the user possessing the corresponding private key. This is used to ensure confidentiality. Using digital signatures, a message signed with a user's private key can be verified by anyone who has access to the user's public key, thereby proving that the user signed it and that the message has not been tampered with. This may be used to ensure authenticity or prevent repudiation.

A central problem for public key cryptography is proving that a public key is authentic, and has not been tampered with or replaced by a malicious third party. The usual approach to this problem is to use a public key infrastructure (PKI), in which one or more third parties, known as certificate authorities, certify ownership of key pairs. While public key infrastructures provide a workable solution to the problem of ensuring the authenticity of a public key, they are of considerable complexity and expense to establish and maintain. Another approach, used by PGP ("Pretty Good Privacy"), is the "web of trust" method to ensure authenticity of key pairs.

DETAILED DESCRIPTION

In the following detailed description, reference is made to the accompanying drawings that form a part hereof, and in which are shown, by way of illustration, specific embodiments in which the inventive subject matter can be practiced. It is understood that other embodiments may be utilized and structural changes may be made without departing from the scope of the inventive subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

According to one example embodiment, the inventive subject matter disclosed herein provides a public key cryptographic system and method wherein no public key infrastructure is required for its use and operation. Instead, key generation is based on a shared digital data file, such as a shared digital image, shared between parties using the system or method. According to one embodiment, but not by way of limitation, the shared digital data file may be private to one of the parties, and shared with another one of the parties. By using the same digital data file as seed material, and the same key generation processes, each party may independently generate identical public/private key pairs, and use those keys to communicate securely with one another. Accordingly, there is no requirement for a certificate authority or revocation checking, or other such features of public key infrastructure. Further, the digital signature according to the inventive subject matter described herein may be used as a persistent authentication, as compared to for example transitional authentication.

Figure 1:
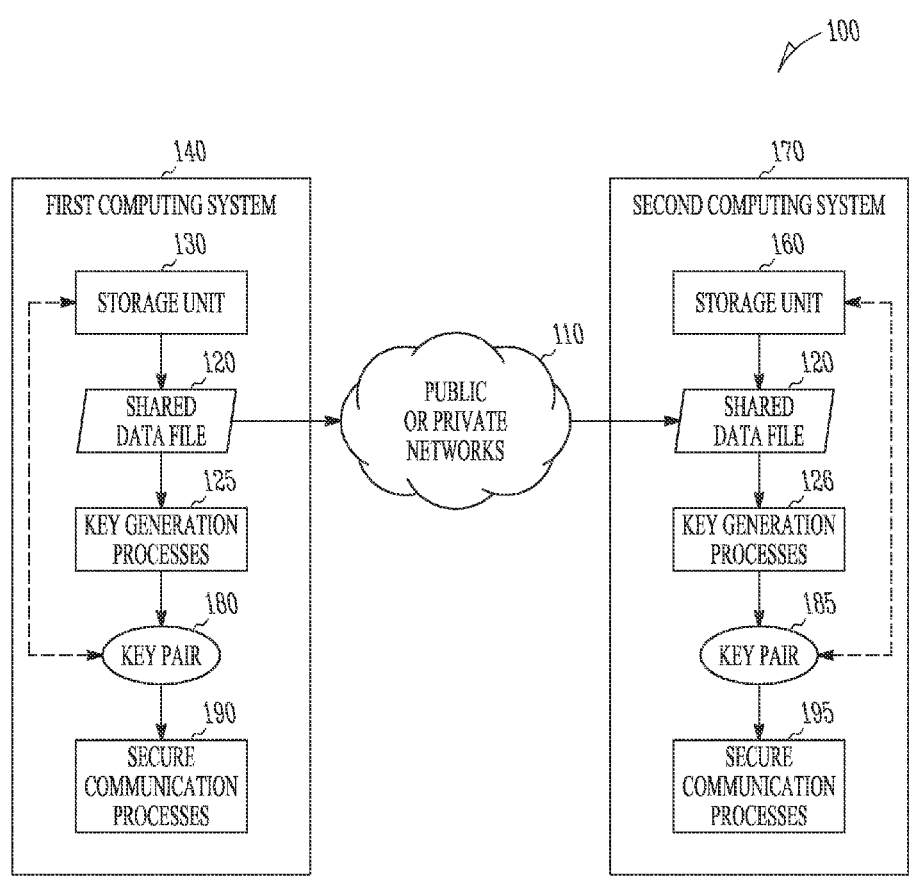
FIGS. 1 and 2 illustrate a system and method for a public key cryptography system according to one example embodiment of the inventive subject matter disclosed herein.

Referring now to FIG. 1, there is illustrated a first example embodiment 100 of a system and method according to the inventive subject matter described herein. A digital data file 120, such as a digital image, is selected from a storage unit 130 that is part of or alternatively external to a first computing system 140. Digital data file 120 may be selected by a human agent, or automatically selected by software executing on the first computing system 140. The digital data file 120 is provided or shared with a second computing system 170 and stored at least temporarily on a storage unit 160 that may be part of the second computing system 170 or external to it. The first computing system 140 uses the digital data file 120 as a seed in one or more key generation processes 125 to create a first cryptographic key pair 180 to be used on the first computing system 140. The second computing system 170 also uses the digital data file 120 and key generation processes 126 as a seed to create a second cryptographic key pair 185 to be used on the second computing system 170. Each of the computing systems 140 and 170 use the same key generation processes 125 and 126, respectively, so that the first and second key pairs 180 and 185 are identical. Alternatively, the computing systems 140 and 170 may use different key generation processes so long as they both generate identical key pairs 180 and 185 from the same seed or seeds.

According to one example embodiment, the digital data file 120 may be shared through any means, such as through a public or private network 110, or physical transfer on a machine readable media. The transfer of the digital data file 120 between computing systems 140 and 170 may be secured or unsecured. In one embodiment, for example, the data file 120 is shared through a different or alternate communication path, such as a connection, session, channel or other exchange mechanism, to avoid or reduce the possibility of the shared file 120 being discovered by a third party monitoring communications between the parties sharing the file 120. Such sharing may be referred to as "out-of-band" from the communication path used for sharing encrypted data between the parties using the encryption keys 180 and/or 185. Further, according to one embodiment, the shared file 120 is kept confidential by both parties to preclude the possibility of it being used by a third party to determine the key pairs 180 or 185 such that the keys are compromised. For example, the shared file 120 may be kept confidential by sharing it only between the parties and not with any other party.

Figure 2:
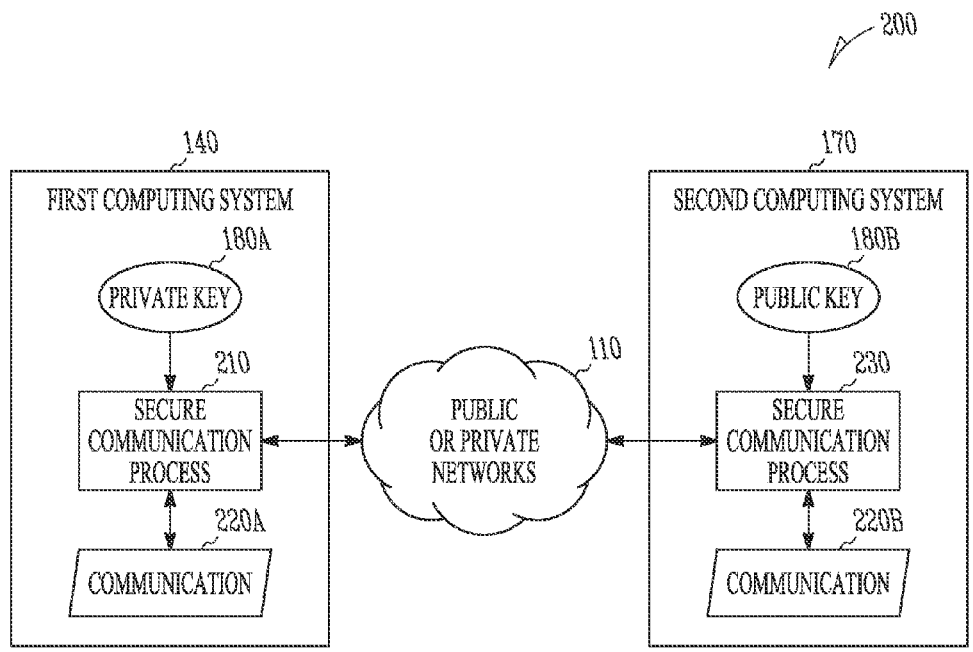

The key pairs 180 and 185 are, in one embodiment, public and private keys used in a public key cryptographic system, for example a private key, 180-a and a public key 185-b, as illustrated in FIG. 2. The keys may be created in any order, and the first key pair 180 may be created before or after the digital data file 120 is shared with the second computing system 170. Key pairs 180 and 185 may be used by secure communication processes 190 and 195, respectively, on the first and second computing systems 140 and 170, to perform any of the functions available to users of a public key cryptography system, including the encryption and decryption of information, the signing of digital communication or document, or any other purpose supported by the keys. For example the keys may be used to support secure socket layer (SSL) communication and authentication between one or more computing systems. According to one example embodiment, the key pairs 180 and 185 can either be immediately used and discarded, and regenerated again later when required, or cached securely for later use, on the first and second computing systems 140 and 170, for example in storage unit 130 or 160, respectively. Storage units 130 and 160 may be any suitable storage, such as magnetic media, random access memory, optical storage media, or non-volatile random access memory, such as flash memory.

According to one embodiment 200, accordingly, as shown in FIG. 2, the first computing system 140 may use secure communication processes 210 to securely exchange digital information with another computing system, for example by encrypting or signing a communication 220a with a private key 180-a of key pair 180, and sending it to the second computing system 170. The computing system 170 may then use the public key 185-b of key pair 185, which is the matching public key for private key 180-a, to decrypt or authenticate the signature using secure communication processes 230. The second computing system 170 may also encrypt or sign a communication using processes 230 to send to the first computing system 140, using for example the public key 185-b, so that the first computing system 140 may decrypt or authenticate the signature of the communication using its private key 180-a. Alternately, the first or second entities may use keys 180-b and 185-a, respectively, to encrypt and decrypt or sign and authenticate a communication 220a or 220b.

Figure 3:
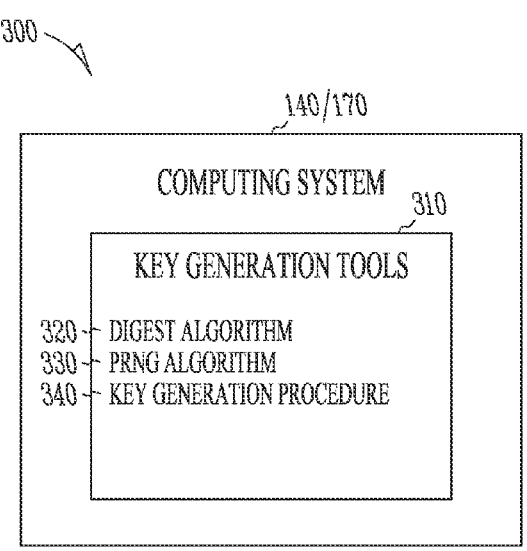
FIGS. 3, 4 and 5 illustrate a system and method for a public key cryptography system according to one example embodiment of the inventive subject matter disclosed herein.

According to one example embodiment 300, illustrated in FIG. 3, each of computing systems 140 and 170 may include key generation tools 310. Tools 310 may include, for example, a digest algorithm 320, a pseudorandom number generator (PRNG) algorithm 330, and a key generation procedure 340. According to one example embodiment, the generation of public/private key pairs uses the digest algorithm 320, PRNG 330 and key generation procedure 340, and may be based on the RSA public/private key algorithms, where the shared digital data file 120 is used as a seed. Other public/private key algorithms, such as those provided by DSA or ECDSA or others, can be implemented for example to generate the key pairs. According to one example embodiment, the following process may be used:

1. Select a digital data file (for example file 120 or 620), such as an image file (I) of sufficient entropy.
2. Create a digest (D) from (I) using a digest algorithm (Ad) providing at least 256 bits of entropy (e.g. SHA-2).
3. Use (D) as the seed value to initialize a PRNG (Ar). A suitable PRNG is described by Sharon Keller in "NIST-Recommended Random Number Generator Based on ANSI X9.31 Appendix A.2.4 Using the 3-Key Triple DES and AES Algorithms."
4. Using the initialized PRNG (Ar) and a suitable generation procedure (Ag) generate a pair of suitable prime numbers (p,q). An example of a suitable generation procedure is described by Robert D. Silverman in "Fast Generation of Random, Strong RSA Primes", May 1997.
5. Using this prime number pair, generate the RSA public and private keys.
   5.1. Compute n=p q, where n is used as the modulus for both the public and private keys.
   5.2. Compute $\lambda(n)=1$ cm(p−1, q−1)
   5.3. Choose an integer e>1 coprime to $\phi(n)$, i.e. e and qp(n) share no factors other than 1, where e is released as the public key exponent.
   5.4. Compute d, to satisfy the congruence relation de equiv 1 (mod $\phi(n)$) i.e. de=1+k$\phi(n)$, for some integer k, where d is kept as the private key exponent.

Figure 4:
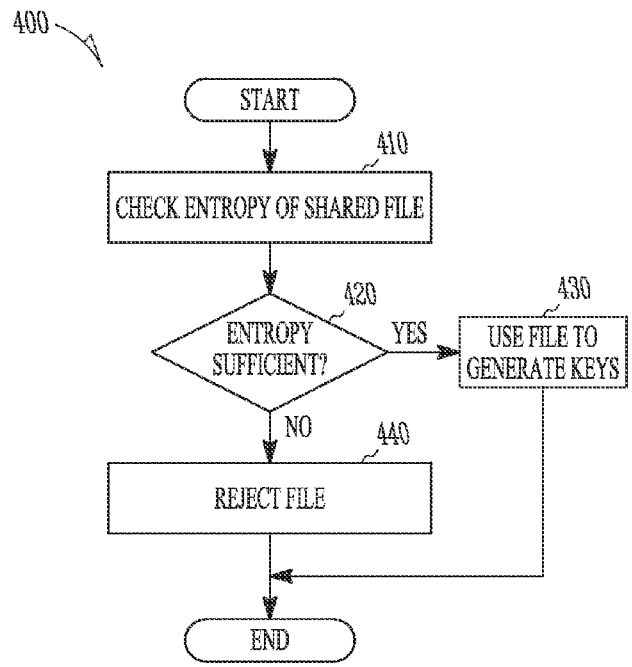

According to at least one embodiment 400 illustrated in FIG. 4, the shared digital data file 120 may be checked 410 to determine if it has sufficient entropy to generate secure cryptographic keys. If 420 the file has sufficient entropy, it can be used 430 as a seed to the key generation processes. If not, the file is rejected 440. In one example embodiment, the entropy of a data file may be determined by applying a compression algorithm to the file and determining if the file compressed sufficiently to indicate it had enough entropy to be used as seed material to produce a secure cryptographic key or key pair. According to another embodiment, the shared digital data file may be digital image selected from one of the computing entity's computing systems, and may for example be digital photographic image or digital illustration, or a computer generated digital image. According to another example embodiment, more than one file or set of data may be used as a seed to generate the cryptographic keys, for example by combining the shared digital data file 120 with another file or set of data, or by manipulating or altering the shared digital data file 120 prior to using it.

Thus, as illustrated above and below herein, the various embodiments described herein provide a way for a digital identification, such as through a public/private key pair, to be created based on shared information and without requiring a public key infrastructure, a certificate authority, or revocation checking. Instead, various embodiments described herein may use existing infrastructure, such as e-commerce server systems that process commercial transactions on the Internet, to carry out authentication during online transactions and make it also available for offline authentication.

Figure 5:
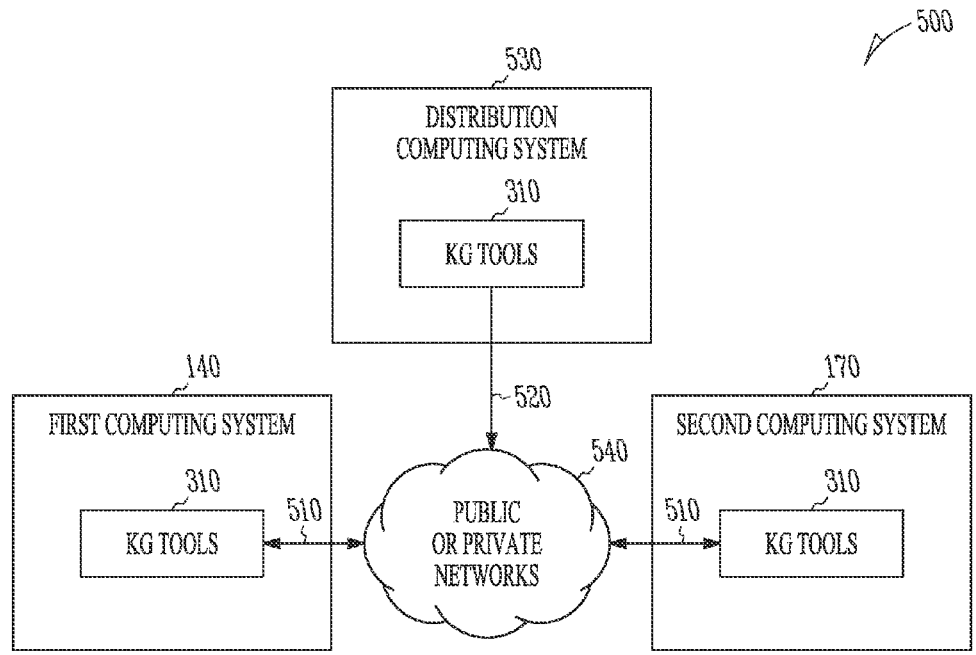

According to another example embodiment 500 illustrated in FIG. 5, the key generation (KG) tools 310 may be distributed 510 from one computing system 140 or 170 to the other computing system 140 or 170, or may be distributed 520 to system 140 and 170 from a tool distribution computing system 530, such as a server computer, over a public or private network 540, such as a wide area network, for example the Internet.

Figure 6:
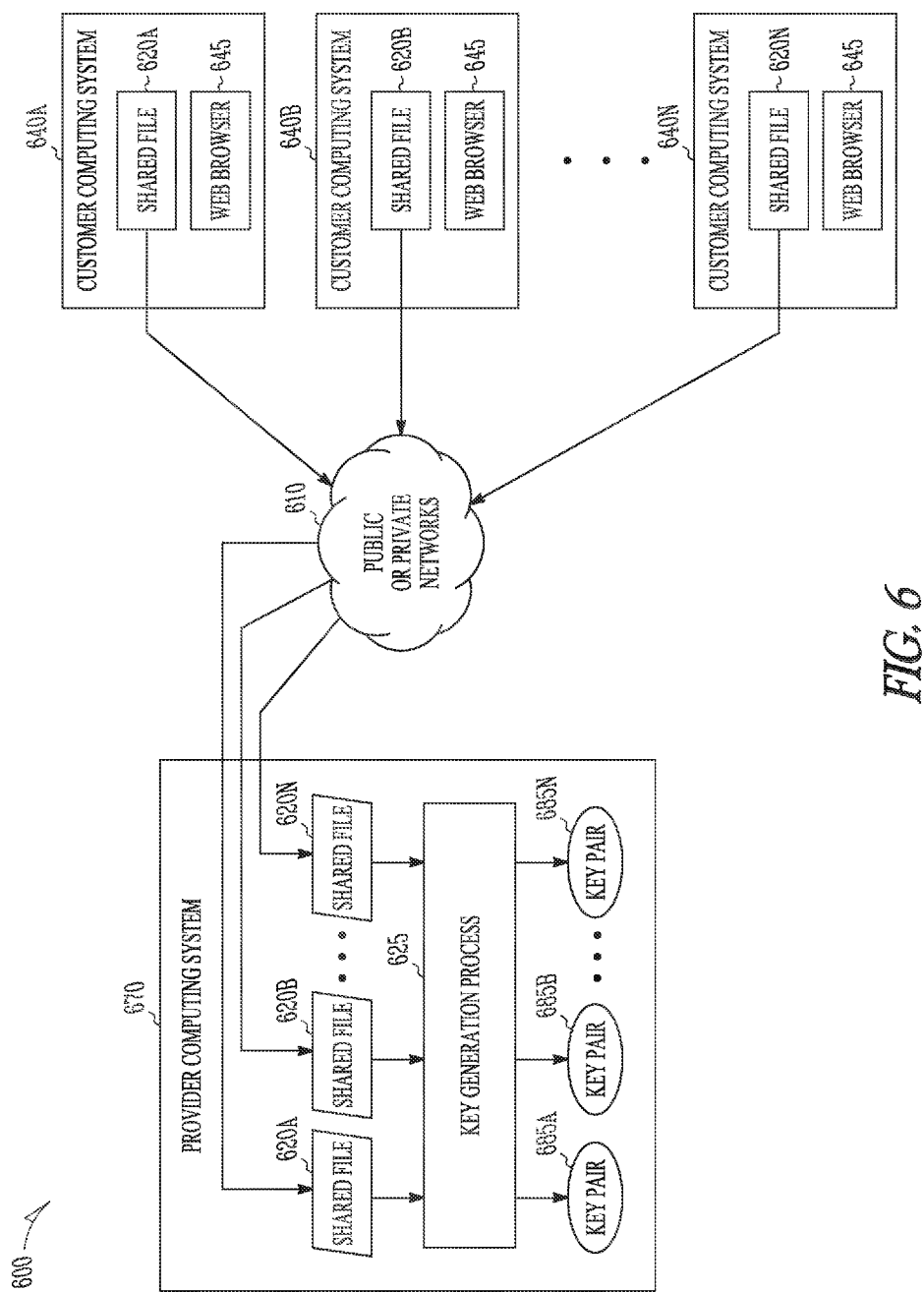
FIG. 6 illustrates a system and method for a public key cryptography system used by a provider according to one example embodiment of the inventive subject matter disclosed herein.

According to one embodiment 600 illustrated in FIG. 6, there is provided a system and method wherein one or more customer computing systems 640a, 640b . . . 640n, and a provider computing system 670 can be used, for example, to perform on-line transactions such as but not limited to the purchase of goods or services from the provider or a provider's customer or affiliate. Systems 640 and 670 may communicate with each other over a network, for example a wide area network 610 such as the Internet. System 640 may be a client computing system including web browser 645 that may interact with one or more server computers forming at least part of the provider computing system 670.

According to one example embodiment, a digital data file 620a, 620b . . . 620n, for example a digital image, is sent from the respective customer computing system 640 through the network 610 to the provider computing system 670 and may be stored at least temporarily on the computing system 670. As for example discussed above with respect to FIGS. 1 and 2, the customer computing system 640 may use the digital data file 620 as a seed to create a first cryptographic key pair to be used on the customer computing system 640, and the merchant or service provider computing system 670 also uses the digital data file 620a, 620b . . . 620n, as a seed to create a second cryptographic key pair 685a, 685b . . . 685n, corresponding to the key pairs generated on the respective customer computing systems 640a, 640b . . . 640n. Key pairs 685a, 685b . . . 685n are then used on the provider computing system 670 to communicate with the respective customer computing systems. Further, as described above, the customer computing systems 640 and provider computing system 670 use the same key generation processes 625 (shown only on provider system 670 but also present on systems 640) so that the respective key pairs on each respective system are identical. According to one example embodiment, each digital data file 620a, 620b . . . 620n is unique, for example a digital picture taken by the customer and not otherwise published or shared with any other entity.

According to one embodiment, the respective corresponding key pairs on may be used by the computing systems 640 and 670 to perform any of the functions available to users of a public key cryptography system, as for example discussed with respect to FIG. 2 above. According to another alternate embodiment, the digital data file used as a seed to generate the cryptographic keys may alternatively originate from the merchant or service provider computing system 670, and be sent to the customer computing system 640, such that both parties use that digital data file to generate the cryptographic keys.

Figure 7:
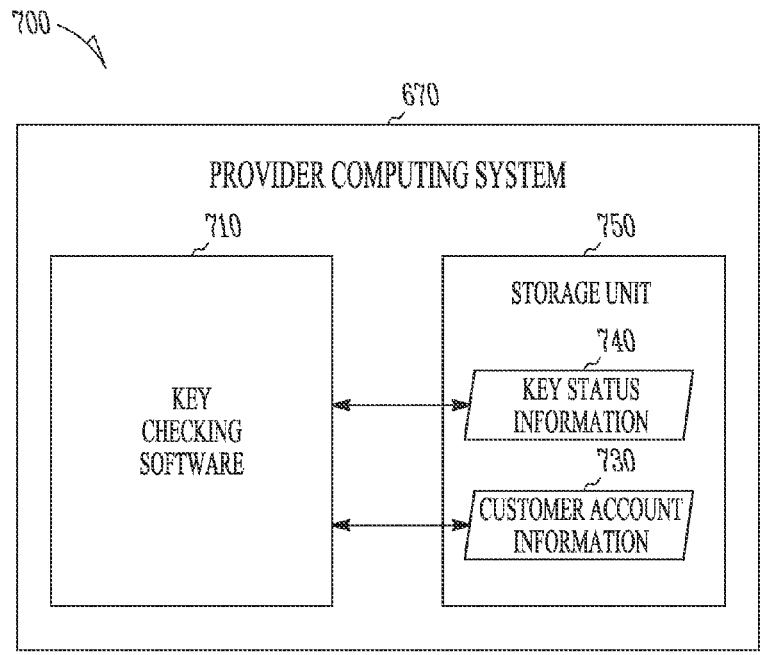
FIG. 7 illustrates a system and method for determining the validity of a key according to one example embodiment of the inventive subject matter disclosed herein.

According to one example embodiment 700 illustrated in FIG. 7, provider computing system 670 may include software 710 to determine if any keys 685 cached by the system 670 are valid. The validity of the cached key may be determined by software 710, for example, by checking to see if the customer's account 730 is current, and if the account is current considering the keys valid and if the account is not current, considering the keys invalid or revoked. According to another embodiment, key status information 740 may be stored on a storage unit 750 on or external to computer system 670, and used to keep a valid or invalid (revoked) status indication for the keys 685. Keys 685 may be set to an invalid status, for example, if a customer reports that a shared digital data file 620 has been compromised. Thus the status information 740 may be used by software 710 to determine that the keys 685 are invalid and therefore not to be trusted to validate the customer or communicate with the customer. Thus, as the service provider already has infrastructure to check whether a user's account is in good standing or not to provide online access, the same infrastructure is used to check for digital signature's revocation status. Accordingly, there is no need for public key infrastructure-based revocation checking.

Figure 8:
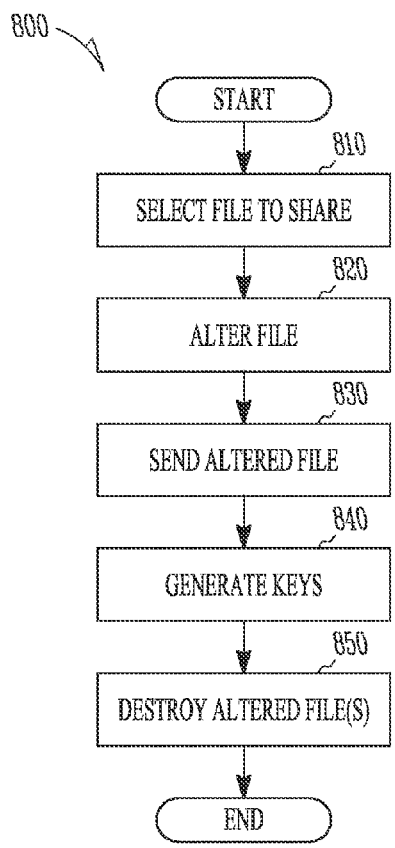
FIG. 8 illustrates a system and method for altering a digital data file prior to using it as a seed according to one example embodiment of the inventive subject matter disclosed herein.

According to still another example embodiment illustrated in FIG. 8, there is provided a method 800 for altering or "salting" a selected digital data file prior to sharing of the digital data file with another party, sharing the image, and then destroying the image. The selected digital data file is selected 810. The digital data file is then altered or salted 820. Where the data file is an image, the alteration may for example be accomplished by adding or altering the least significant bits or header information for the image, by introducing a faint watermark overlaying the image, or by any other method that alters the data content of the image. According to one example embodiment, the method chosen to alter the image or other file will depend to some degree on the file or image format being altered. Possible methods can be drawn from the realm of image watermarking and steganography. In one example embodiment, an altered image is still recognizable as a derivative image after the alteration. The altered image is then sent 830 to the other party and used by both parties to generate 840 a cryptographic key pair using the altered image as a seed and same cryptographic key generation procedure, as described above, for example. After the altered image is used to generate the keys, it may be destroyed 850 by both parties such that they seed material is not longer available to be used to generate the keys, thereby reducing the possibility that the key security may be compromised. Further, the original digital data file may be retained without worry of compromising the security of the cryptographic keys generated with its altered version. Accordingly, the user may use the same digital data file or image for multiple different server providers. While the generation of keys in this and other illustrations or passages herein may imply that the keys be generated in a specific order, there is no such requirement, such that a shared data file may be used to generate keys before or after it is sent to another system.

Figures 9, 10, 11:
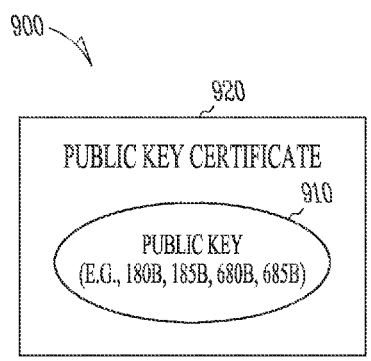
FIG. 9 illustrates a system and method for using a key generated with a shared digital data file in a public key infrastructure according to one example embodiment of the inventive subject matter disclosed herein.
FIGS. 10 and 11 illustrate a machine readable medium including a program for use in a public key cryptography system according to one example embodiment of the inventive subject matter disclosed herein.

Referring now to FIG. 9, there is illustrated an alternate embodiment 900 wherein the cryptographic keys 910 (such as the public or private key of key pairs 180, 185, 680, 685 referred to above) generated using a shared digital data file are associated with a public key certificate (PKC) 920, such as a X.509 certificate, issued by a Certificate Authority. In this example, the X.509 certificate can either be self-signed or signed by a trusted authority. This allows the "identity" created from the shared digital data file to be used in any application requiring a standard X.509 certificate. By making such an association, the keys 910 are capable of being used in a Public Key Infrastructure wherein a digital signature of the Certificate Authority is used to bind together a public key with an identity and is used to establish a trust relationship in the Public Key Infrastructure. Further, the rules of a standard for a Public Key Infrastructure, which may be set for the purpose of guaranteeing interoperability, may be public or proprietary, and may be established by either a private or public body.

Referring now to FIG. 10, there is illustrated another example embodiment 1000 of the inventive subject matter described herein, wherein there is provided a machine readable medium 1010 comprising at least one computer program 1020 stored on the medium 1010, wherein when the at least one computer program is executed on a computer to receive a digital data file that is shared by a computing entity, use the digital data file to generate a public key cryptographic key pair using the digital data file as at least one seed to a key generation procedure, and to use at least one key of the public key cryptographic key pair to send or receive digital information to or from the computing entity from which the digital data file is received.

According to another example embodiment illustrated in FIG. 11, there is illustrated another example embodiment 1100 of the inventive subject matter described herein, wherein there is provided a machine readable medium 1110 comprising at least one computer program 1120 stored on the medium 1110, wherein when the at least one computer program is executed on a computer to select and/or send a digital data file that is shared with a computing entity, use the digital data file to generate a public key cryptographic key pair using the digital data file as at least one seed to a key generation procedure, and to use at least one key of the public key cryptographic key pair to send or receive digital information to or from the computing entity with which the digital data file is shared. According to another embodiment, the computer program 1120 may further enable a user of the computer to select the digital data file and/or to determine if the digital data file to send to the computing entity has sufficient entropy to be used as at least one of the seeds.

According to one example embodiment, it is important that the digital data file that is shared be kept private and shared only with the trusted parties since this is the basic for the key generation. A unique image file must be provided for each unique key pair to be generated. With the exception of the image file, the other elements of the key generation process can be predetermined by the implementation.

Figure 12:
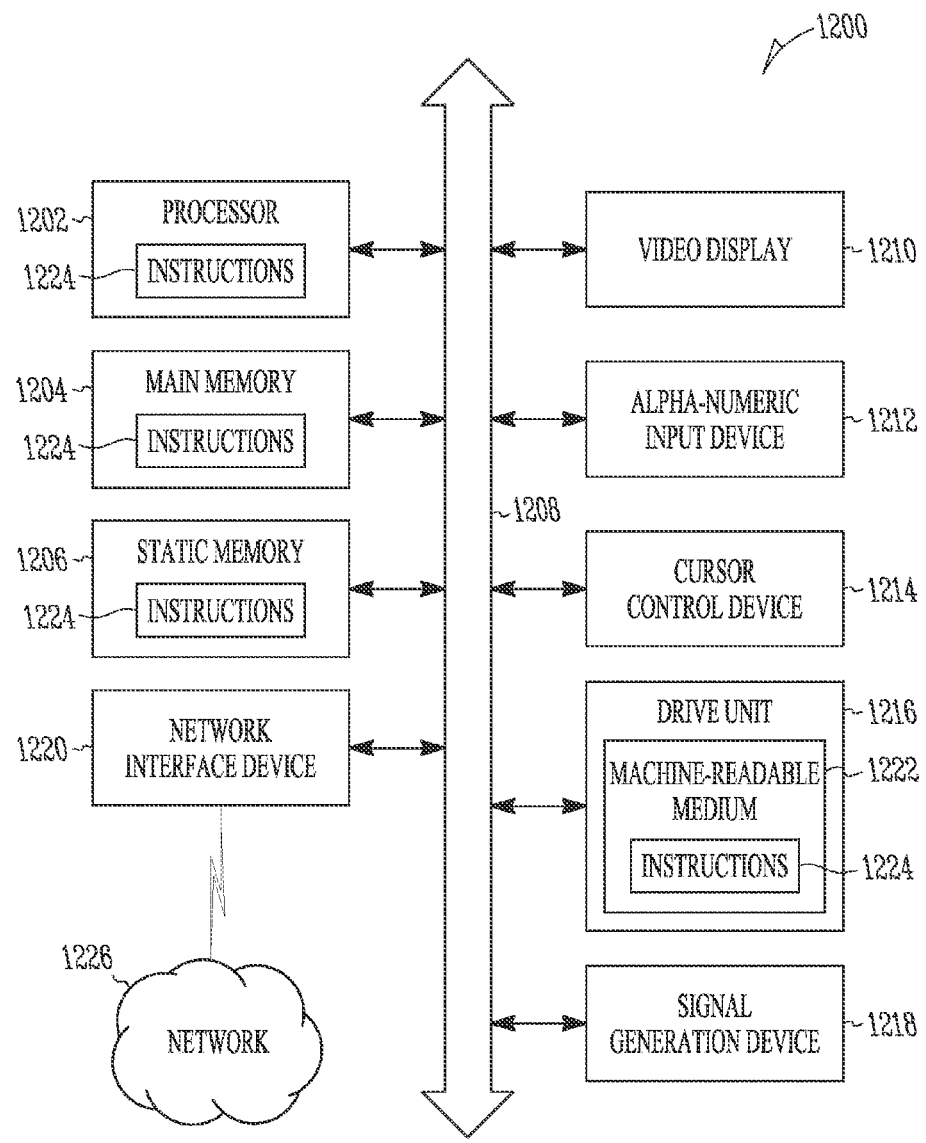
FIG. 12 illustrates a diagram of one example embodiment of a computing system architecture according to the inventive subject matter disclosed herein.

FIG. 12 shows a diagrammatic representation of a machine in the example form of a computer system 1200 within which a set of instructions 1224, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220. The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may further be transmitted or received over a network 1226 via the network interface device 1220 utilizing any one of a number of well-known transfer protocols, for example the hyper text transfer protocol (HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by, or associated with, such a set of instructions. The term "machine-readable medium" shall accordingly be taken to include, but not be limited to, solid-state memories, optical and magnetic media, and carrier wave signals.

In this description, numerous specific details are set forth. However, it is understood that embodiments of the invention may be practiced without these specific details. In other instances, well-known circuits, software, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the inventive subject matter can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration. Further, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Still further, processes referred to herein that may be carried out on a computer system shall be understood to be implemented, for example but not by way of limitation, in software or hardware, or a combination thereof. Additionally, some embodiments may not perform all the operations shown in a flow diagram. Moreover, it should be understood that although the flow diagrams depict serial operations, certain embodiments could perform certain of those operations in parallel.

What is claimed is:

1. A method comprising:
    selecting a digital image file to be used as a seed to generate at least one key of a public key cryptographic key pair;
    altering, using a processor of a machine, the digital image file to create an altered digital image file;
    generating the at least one key of the public key cryptographic key pair by using the altered digital image file as the seed; and
    using the at least one key of the public key cryptographic key pair to securely communicate with at least one party.

2. The method of claim 1, wherein the altering of the digital image file comprises introducing a watermark to an image of the digital image file.

3. The method of claim 1, wherein the altering of the digital image file comprises altering least significant bits of an image of the digital image file.

4. The method of claim 1, wherein the altering of the digital image file comprises altering header information of an image of the digital image file.

5. The method of claim 1, wherein the altering of the digital image file comprises combining the digital image file with a set of data to create the altered digital image file.

6. The method of claim 1, wherein the altering of the digital image file comprises combining the digital image file with a second file to create the altered digital image file.

7. The method of claim 1, further comprising determining whether the digital image file has sufficient entropy to be used as at least one seed.

8. The method of claim 7, further comprising, in response to determining that the digital image file does not have sufficient entropy, rejecting the digital image file.

9. The method of claim 1, further comprising destroying the altered digital image file after the generating of the at least one key of the public key cryptographic key pair.

10. The method of claim 1, further comprising sending the altered digital image file to at least one party to allow the at least one party to generate an identical public key cryptographic key pair.

11. A non-transitory machine-readable storage medium comprising instructions that, when executed by one or more processors of a machine, configure the machine to perform operations comprising:
    selecting a digital image file to be used as a seed to generate at least one key of a public key cryptographic key pair;
    altering the digital image file to create an altered digital image file;
    generating the at least one key of the public key cryptographic key pair by using the altered digital image file as the seed; and
    using the at least one key of the public key cryptographic key pair to securely communicate with at least one party.

12. The non-transitory machine-readable storage medium of claim 11, wherein the altering of the digital image file comprises introducing a watermark to an image of the digital image file.

13. The non-transitory machine-readable storage medium of claim 11, wherein the altering of the digital image file comprises altering least significant bits of an image of the digital image file.

14. The non-transitory machine-readable storage medium of claim 11, wherein the altering of the digital image file comprises altering header information of an image of the digital image file.

15. The non-transitory machine-readable storage medium of claim 11, wherein the altering of the digital image file comprises combining the digital image file with a set of data to create the altered digital image file.

16. The non-transitory machine-readable storage medium of claim 11, wherein the altering of the digital image file comprises combining the digital image file with a second file to create the altered digital image file.

17. The non-transitory machine-readable storage medium of claim 11, wherein the operations further comprise determining whether the digital image file has sufficient entropy to be used as at least one seed.

18. The non-transitory machine-readable storage medium of claim 11, wherein the operations further comprise destroying the altered digital image file after the generating of the at least one key of the public key cryptographic key pair.

19. The non-transitory machine-readable storage medium of claim 11, wherein the operations further comprise sending the altered digital image file to at least one party to allow the at least one party to generate an identical public key cryptographic key pair.

20. A system comprising:
    one or more computing devices;
    at least one set of instructions executing on the one or more computing devices to:
        select a digital image file to be used as a seed to generate at least one key of a public key cryptographic key pair;
        alter the digital image file to create an altered digital image file;
        generate the at least one key of the public key cryptographic key pair by using the altered digital image file as the seed; and
        use the at least one key of the public key cryptographic key pair to securely communicate with at least one party.

* * * * *